United States Patent [19]

Landau

[11] 4,037,024
[45] July 19, 1977

[54] FUEL CELL PRODUCT-WATER MANAGEMENT SYSTEM

[75] Inventor: Michael B. Landau, West Hartford, Conn.

[73] Assignee: The United States of America as represented by the Secretary of the Navy, Washington, D.C.

[21] Appl. No.: 331,133

[22] Filed: Feb. 9, 1973

[51] Int. Cl.$^2$ ............................................. H01M 8/04
[52] U.S. Cl. ................................................... 429/17
[58] Field of Search ........................... 136/86 R, 86 E

[56] References Cited

U.S. PATENT DOCUMENTS

| 3,462,308 | 8/1969 | Winters | 136/86 R |
| 3,525,643 | 8/1970 | Spahrbier et al. | 136/86 E |
| 3,748,180 | 7/1973 | Clausi et al. | 136/86 R |

Primary Examiner—John H. Mack
Assistant Examiner—H. A. Feeley
Attorney, Agent, or Firm—R. Sciascia; R. Beers; S. Sheinbein

[57] ABSTRACT

A product-water management system removes steam produced by the reaction of hydrogen and oxygen in a fuel cell, by circulating a hydrogen stream, containing the steam, from the fuel cell to a condenser where the water is liquified and collected in a sump. A continuously operating pump forces water and/or hydrogen from the sump through a transfer line to a water storage tank. Hydrogen is vented back to the condenser from the storage tank through a vent line concentrically mounted within the transfer line. A tank drain on the storage tank allows hydrogen to be purged between missions.

4 Claims, 1 Drawing Figure

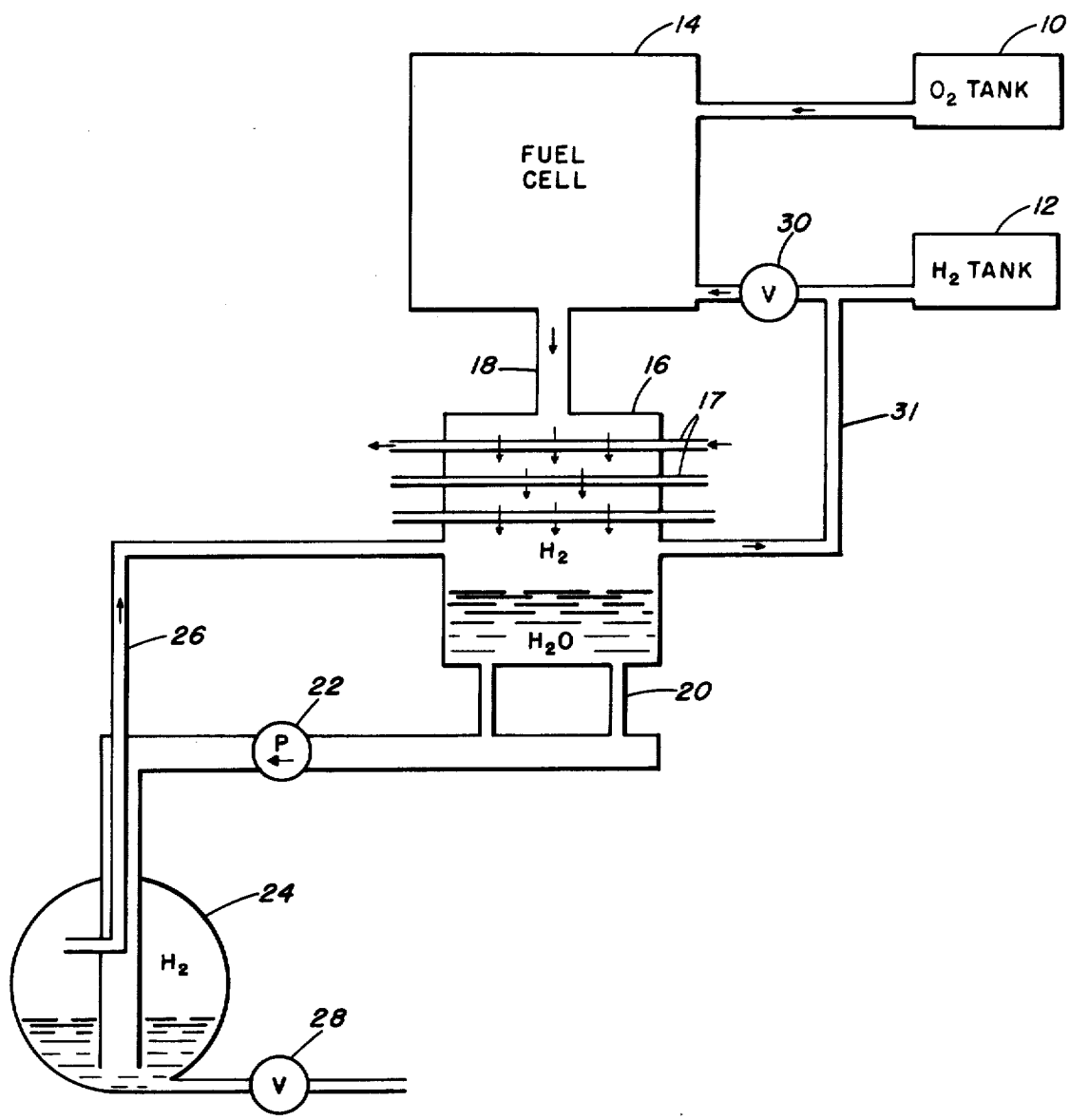

FUEL CELL PRODUCT-WATER MANAGEMENT SYSTEM

BACKGROUND OF THE INVENTION

The present invention relates generally to fuel cells and, more particularly, to fuel cells of the hydrogen-oxygen type. Fuel cells for the production of electrical energy from a gas or liquid containing a combustible component and an oxidizing gas are well known in the art. In a typical fuel cell a combustible gas, such as hydrogen, is introduced into a cell through a porous electrode made, for example, of a noble metal or of porous carbon containing a noble metal catalyst. Oxygen or an oxygen-containing gas is introduced through a second porous electrode containing, perferably, an active metal oxide catalyst, the two electrodes being electrolytically connected through either an aqueous electrolyte solution or a solid electrolyte, for example, an ion-exchange membrane. In these cells, low voltage D.C. energy is produced directly from the reaction of hydrogen and oxygen at relatively high conversion efficiencies. Because they are light weight and portable, such sources of electrical energy are particularly suitable for military and space purposes where a ready source of electrical energy is often not available.

When such cells are used for the production of electrical power, hydrogen and oxygen are consumed to form water which dilutes the electrolyte. The water is formed in the vicinity of the hydrogen electrode and at the operating temperature of the cell easily turns into steam. In order to maintain the concentration of the electrolyte, the water vapor must be removed from the cell. Typically, this removal is accomplished by circulating a hydrogen stream containing the water vapor through a condenser where the water is liquified. Liquified water can then be pumped to water storage tanks where it will be stored for future use.

The use of a pump requires that energy from the system be expended. Because fuel cells are employed in situations where energy already is in short supply, it is imperative that energy for the pump be kept to a minimum. In addition, because fuel cells are often used in sub-freezing environments, precautions must be taken to assure that water vapor is not allowed to freeze and thus clog lines. By way of example, such a sub-freezing environment may be encountered in deep submergence applications where the water storage tank is outside the power plant containment vessel and the sea water temperature may be as low as 28° Fahrenheit.

SUMMARY OF THE INVENTION

A product-water management system for a hydrogen-oxygen fuel cell is supplied through feed lines with hydrogen and an oxygen containing gas. A vent line is used to vent hydrogen back to the condenser from the water storage tank, equalizing the pressure in the condenser and water storage tank, thus removing the possibility that the pump will have to do extra work as the water storage tank fills. The vent line is concentrically mounted within the transfer line leading from the condenser to the water storage tank. The warm water in the transfer line prevents water vapor in the vent line from freezing. The pump runs continuously, eliminating the need for on-off controls.

An object of the present invention is to provide an improved product-water management system for fuel cells.

Another object is to provide a product-water management system which requires a constant pump head rise.

A further object of the invention is to prevent freezing in the vent line of a fuel cell product-water management system.

Other objects, advantages, and novel features of the present invention will become apparent from the following detailed description of the invention when considered in conjunction with the accompanying drawing.

BRIEF DESCRIPTION OF THE DRAWING

The single FIGURE is a diagrammatic view of a fuel cell employing the product-water management system of the invention.

DESCRIPTION OF THE PREFERRED EMBODIMENT

The FIGURE, which illustrates a preferred embodiment of the system, shows a fuel cell 14 being suplied with oxygen or an oxygen-containing gas from tank 10 and hydrogen from tank 12. Various valves and pressure regulators (not shown) control the flow of gases from the tanks to the fuel cell. Line 18 is connected in a known manner to the gas supply side of the fuel cell electrode (not shown). Steam produced in the vicinity of the electrode is carried through line 18 to a condenser 16 where the water vapor is liquified by cooling lines 17. The liquid water is collected in a sump within condenser 16.

A transfer line 20 connects the sump to the water storage tank 24. A small, centrifugal pump 22 is provided which will pump water, a mixture of water and hydrogen, or hydrogen alone. The pump may be run electrically or by energy available in the hydrogen as it enters the fuel cell under pressure. In either case the pump runs continuously eliminating the need for on-off controls.

A vent line 26 connects the water storage tank 24 with condenser 16. The vent line allows the pressure of the gas in tank 24 and condenser 16 to equalize. The connection eliminates pressure build-up in water storage tank 24 and thereby maintains the head rise on pump 22 substantially constant. Because water vapor also is present in vent line 26 and might freeze in certain environments, line 26 is concentrically mounted within transfer line 20 to eliminate the possibility of freezing. This aspect is important in deep submergence applications where the water storage tank 24 is located outside the power plant containment vessel and the sea water temperature may be as low as 28° Fahrenheit. Valve 28 and 30 allow hydrogen and/or water to be purged from the system through an ejector line 31 (recycle line) connecting the hydrogen feed line to the condenser by the pressure of the gas within the system, which is above the pressure of the surrounding atmosphere.

In operation an oxygen-containing gas and hydrogen are supplied to the fuel cell 14. The reaction in the vicinity of the hydrogen electrode is exothermic and the water produced is quickly turned to steam. The water vapor produced is removed to condenser 16 where it is liquified and collected. The water is removed by a continuously operating pump through transfer line 20 to water storage tank 24 which is sized to accept all of the water produced from the reaction of the hydrogen and oxygen in the fuel tanks. Vent line 26 mounted within line 20 equalizes pressure between the storage tank 24 and condenser 16. Hot water, 160° F, in the transfer line prevents water vapor in line 26 from freezing in adverse environments. By closing valve 30 and opening tank drain 28, hydrogen at a pressure greater than the surrounding atmosphere can be purged between missions thereby eliminating the need for a separate hydrogen purge valve in tank 12. Known hydrogen-oxygen type fuel cells as well as known condensers and pumps may be employed in the system.

Obviously many modifications and variations of the present invention are possible in light of the above teachings. It is therefore to be understood that within the scope of the appended claims, the invention may be practiced otherwise than as specifically described.

What is claimed is:

1. A product-water management system for a hydrogen-oxygen fuel cell supplied through feed lines with hydrogen and an oxygen-containing gas, said system comprising:
   conduit means for removing steam-carrying hydrogen from the fuel cell;
   a condenser connected to said conduit means for converting said steam into water;
   a water storage tank;
   a tansfer line connecting said storage tank to said condenser;
   a continuously operating pump mounted in said transfer line; and
   a vent line at least partially mounted within said transfer line connected at one end to said water storage tank and at the other end to said condenser for equalizing the pressures in said condenser and said water storage tank.

2. The system of claim 1 wherein said vent line is at least partially concentrically mounted within said transfer line.

3. A product-water management system for a hydrogen-oxygen fuel cell supplied through feed lines with hydrogen and an oxygen-containing gas, said system comprising:
   a conduit for removing steam carrying hydrogen from the fuel cell;
   a condenser connected to said conduit for converting said steam into water;
   a water storage tank;
   a transfer line connecting said storage tank to said condenser;
   a continuously operating pump mounted in said transfer line; and
   a vent line mounted at least partially within said transfer line connecting said water-storage tank to said condenser.

4. A product water management system for a hydrogen-oxygen fuel cell adapted to be supplied through feed lines with hydrogen under pressure and with an oxygen-containing gas, said system comprising:
   conduit means adapted to be connected to said fuel cell for removing steam-carrying hydrogen from the fuel cell;
   a condenser connected to said conduit means for converting said steam into water;
   a water storage tank;
   a transfer line connecting said storage tank to said condenser for transferring water and/or hydrogen from said condenser to said tank;
   a pump, adapted to operate continuously, mounted in said transfer line;
   means for equalizing the pressures in said condenser and said water storage tank, said means comprising a vent line directly connecting said water storage tank to said condenser, said vent line being at least partially mounted within said transfer line;
   an ejector line connected at one end to said condenser and at the other end to the hydrogen feed line for enabling hydrogen under pressure in said hydrogen feed line to pass directly to said condenser for purging hydrogen and/or water in said storage tank from said system;
   a drain valve connected to said water storage tank; and
   a valve mounted in said hydrogen feed line to allow hydrogen to be purged from the system through said ejector line, condenser, vent line and water storage tank.

* * * * *